United States Patent
Lee et al.

(10) Patent No.: US 11,389,828 B2
(45) Date of Patent: Jul. 19, 2022

(54) ADDITIVE ENERGY DIRECTOR AND METHOD OF FORMATION

(71) Applicant: GM GLOBAL TECHNOLOGY OPERATIONS LLC, Detroit, MI (US)

(72) Inventors: Saul S. Lee, Franklin, MI (US);
Yongqiang Li, Rochester, MI (US);
Blair E. Carlson, Ann Arbor, MI (US);
Jorge F. Arinez, Rochester Hills, MI (US)

(73) Assignee: GM GLOBAL TECHNOLOGY OPERATIONS, LLC, Detroit, MI (US)

( * ) Notice: Subject to any disclaimer, the term of this patent is extended or adjusted under 35 U.S.C. 154(b) by 1598 days.

(21) Appl. No.: 14/667,110

(22) Filed: Mar. 24, 2015

(65) Prior Publication Data
US 2017/0072433 A1     Mar. 16, 2017

(51) Int. Cl.
| | |
|---|---|
| *B05C 5/04* | (2006.01) |
| *B05B 9/04* | (2006.01) |
| *B05D 5/00* | (2006.01) |
| *B29C 64/106* | (2017.01) |
| *B05B 1/02* | (2006.01) |
| *B05B 9/03* | (2006.01) |
| *B05C 5/00* | (2006.01) |
| *B05C 5/02* | (2006.01) |
| *B05C 11/10* | (2006.01) |
| *B05D 1/02* | (2006.01) |
| *B05D 7/24* | (2006.01) |
| *B29C 65/08* | (2006.01) |

(52) U.S. Cl.
CPC .............. *B05D 5/00* (2013.01); *B05B 1/02* (2013.01); *B05B 9/03* (2013.01); *B05C 5/001* (2013.01); *B05C 5/02* (2013.01); *B05C 11/1044* (2013.01); *B05D 1/02* (2013.01); *B05D 7/24* (2013.01); *B29C 64/106* (2017.08); *B29C 65/08* (2013.01)

(58) Field of Classification Search
None
See application file for complete search history.

(56) References Cited

U.S. PATENT DOCUMENTS

| | | | | |
|---|---|---|---|---|
| 5,740,051 | A * | 4/1998 | Sanders, Jr. | B29C 64/106 347/1 |
| 2002/0105080 | A1* | 8/2002 | Speakman | B33Y 80/00 257/749 |
| 2003/0227499 | A1* | 12/2003 | Sadasivan | B41J 2/211 347/19 |
| 2005/0106321 | A1* | 5/2005 | McMackin | B82Y 40/00 427/258 |
| 2008/0108122 | A1* | 5/2008 | Paul | B01F 33/3012 422/129 |

(Continued)

FOREIGN PATENT DOCUMENTS

| | | |
|---|---|---|
| DE | 2537034 A1 | 2/1977 |
| DE | 3132275 A1 | 9/1982 |

(Continued)

*Primary Examiner* — Alexander M Weddle
(74) *Attorney, Agent, or Firm* — Vivacqua Crane, PLLC (57) ABSTRACT

A method of forming additive energy directors according to various exemplary embodiments can include dispensing a molten material onto a substrate at a predetermined location. The method also includes solidifying the molten material to form at least one additive energy director onto the substrate.

12 Claims, 9 Drawing Sheets

(56) References Cited

U.S. PATENT DOCUMENTS

| | | | |
|---|---|---|---|
| 2008/0210360 A1* | 9/2008 | Soccard | B29C 66/836 156/73.4 |
| 2009/0014917 A1* | 1/2009 | Hodge | B82Y 40/00 264/401 |

FOREIGN PATENT DOCUMENTS

| | | |
|---|---|---|
| DE | 69616690 | 12/2001 |
| WO | 2003082548 A1 | 10/2003 |

* cited by examiner

FIG_1A

FIG_1B

Fig_3A

Fig_3B

Fig_4A

Fig_4B

Fig_6A

Fig_6B

Fig_8A  Fig_8B

Fig_8C  Fig_8D

FIG. 9

ADDITIVE ENERGY DIRECTOR AND METHOD OF FORMATION

TECHNICAL FIELD

The present disclosure relates generally to the formation of energy directors on a substrate for use in ultrasonic or vibration welding.

BACKGROUND

Ultrasonic or vibration welding is a method of joining two parts, such as thermoplastics and thermoplastic composites, together without using additional fasteners, adhesives or mechanical features like snap fit or hinges. Welding is accomplished by applying low amplitude, high frequency mechanical vibration to the two joining parts. Typically, an energy director in the form of a triangular protrusion is molded into an interface between the parts such that it improves the consistency of heating and welding. During the welding, the energy director softens and melts. Then, the molten material flows across the joint interface forming a molecular bond with the mating surface. When the vibration stops, the molten material solidifies as it cools, and forms the bond between the two parts.

Currently, energy directors for ultrasonic or vibration welding are integrally formed on one of the parts during the molding process. This means that the mold die has to be initially designed and precision machined to include the features of the energy director. Any changes to the shape or configuration of the energy director require retooling of the mold die or replacement with a new mold die.

Accordingly, there is a need for a device and method that provides flexibility in the placement of the energy director on a substrate, without the need for expensive retooling and replacement of the mold die late in the manufacturing process.

SUMMARY

A method of forming additive energy directors according to various exemplary embodiments can include dispensing a molten material onto a substrate at a predetermined location; and solidifying the molten material to form at least one additive energy director onto the substrate.

A system for forming additive energy directors according to various exemplary embodiments can include a substrate. A dispenser can dispense a molten material onto the substrate at a predetermined location such that the molten material solidifies to form at least one additive energy director onto the substrate.

The above features and advantages, and other features and advantages, of the present technology are readily apparent from the following detailed description of embodiments and appended claims, when taken in connection with the accompanying drawings.

DETAILED DESCRIPTION

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to employ the present disclosure. For example, any two or more elements described separately could be combined into a single element, and vice versa.

In various embodiments described herein, additive methods are employed to add energy directors to composite materials. In comparison to some conventional techniques, attempts to add energy directors to composite materials have been difficult to produce through molding. In various embodiments, the formation of energy directors through additive methods onto composite materials is applied to the substrate post molding of the substrate. In various embodiments, the formation of the energy directors may be deposited onto the substrate using a variety of alternative techniques including methods of drop-on-demand or spray deposition of molten or dissolved resin materials for ultrasonic or vibration welding. In other embodiments, a 3D template can be incorporated to form more complex feature shapes onto the substrate.

Various embodiments of the energy director formation method described herein provide flexibility in modification of the size and/or location of the energy directors without requiring any changes to the compression mold tooling. Various embodiments of the energy director methods can produce a range of energy directors that can be formed relatively quickly by requiring only a programming change, which avoids typical time delays.

Energy directors prepared using at least one of the techniques described herein demonstrates improved uniformity over a large surface area of a substrate. The system and method provide precise control over the deposition.

Various embodiments relate to a method for deposition of energy directors via a drop-on-demand, a spray, or a continuous stream technique. An additional embodiment relates to a method for adjustable energy director geometry by drop volume control. Another embodiment relates to a method for forming 3D shapes through the use of a template. A further embodiment relates to a method for dispensing resin through the 3D template. An additional embodiment relates to the design of a 3D template for forming energy directors.

Referring to the drawings, wherein like reference numbers correspond to like or similar components wherever possible throughout the several figures. FIGS. 1-8D illustrate different approaches in which energy directors can be processed on a relatively large scale basis, according to various embodiments.

The figures illustrate several exemplary embodiments of systems that depict dispensing devices, such as drop-on-demand devices (FIGS. 1A-4B), a spray device (FIGS. 5A-5B), a continuous stream device (FIGS. 6A-6B), and 3D template forming devices (FIG. 7A-8D). As illustrated in FIG. 9, a controller 900 may be utilized with one or more of the systems to provide open-loop or closed-loop feedback control. Each system may include a source of data, which provide signals that are interpreted by the controller 900 as being commands to emit droplets or a predetermined volume of material. In general use, controller 900 output signals that are inputted to an emission device.

The controller 900 can use a number of different methods to achieve movement of the various components. In one approach, a composite substrate may be moved past a stationary dispenser. Another approach, however, involves maintaining the composite substrate in a stationary position while the dispensers are moved over the composite substrate horizontally and/or vertically. In a further approach, the controller 900 can control the movement such that both the composite substrate and the dispenser move relative to each other. An exemplary controller 900 will be described in further details below with reference to FIG. 9.

Figure 1A:
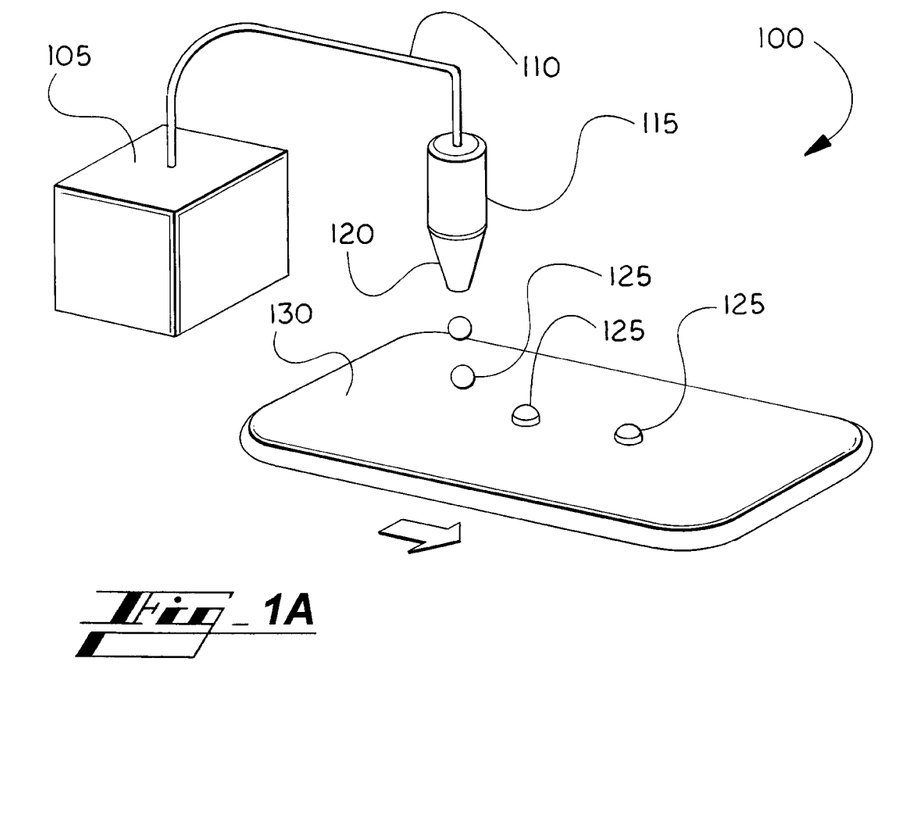
FIG. 1A illustrates the deposition of a plurality of energy directors onto a composite substrate in a single pass using a single nozzle.

Referring to FIGS. 1A-4B, each drop-on-demand device shown in these figures is capable of ejecting droplets of a fluid onto a pre-selected location of a substrate. FIG. 1A illustrates a single pass dispense system 100, which can be utilized for drop-on-demand deposition of a plurality of energy directors 125 onto a composite substrate 130 in a single pass using a single nozzle 120. The substrate used in the system method described herein is not specifically restricted. The substrate can be selected depending on the various factors including the use of the method described above, e.g., the type of energy director to be fabricated. The substrate can be any material used in the fabrication of an energy director. Examples of suitable substrates include polyolefins (polyethylene, polypropylene, etc.), polyamides (nylon, PA6, PA66), other thermoplastics, non-reinforced and/or reinforced composites, and combinations thereof.

The system 100 includes a reservoir 105 that has a conduit 110 which transfers a fluid, such as a molten material, to a dispenser 115. The molten material can include, for example, a thermoplastic or a thermoplastic composite. One of the main characteristics of thermoplastic resins is the ability to be melted and cooled while retaining their properties. Suitable thermoplastic polymers nonexclusively can include polyamides, polyesters, polycarbonates, polysulfones, polyimides, polyurethanes, polyethers, polyolefins, vinyl polymers, and mixtures thereof.

The dispenser 115 is in fluid communication with the reservoir 105. The reservoir 105 may be any one of a number of suitable receptacles capable of allowing a fluid to be transferred to the dispenser 115. It should be noted that the reservoir may be a compartment inside the device or external to the device.

In the example in FIG. 1A, the dispenser 115 depicts a single drop-forming nozzle 120. The dispenser 115 may be any one of a number of dispensers well known in the art for dispensing a fluid, such as heat actuated dispensers, solenoid valve dispensers, piezoelectric dispensers, aerosols dispensers, magneto-constriction dispenser, fluid impulse dispenser, or the like.

For example, in one embodiment, a pressurized reservoir having a predetermined pressure can be used to force a liquid, such as a molten material through the orifice of the nozzle 120 during a predetermined time interval. During operation, a volume of molten material can be forced through an orifice of the nozzle 120 ejecting a droplet of molten material. The system 100 may be utilized to dispense a drop of precise volume of molten material.

In some embodiments, the system 100 may incorporate one or more heating elements (not shown) as a temperature-controlled mechanism to ensure that the molten material remains in a flowable state while residing in the reservoir 105, conduit 110, dispenser 115 and/or nozzle 120 prior to dispensing the molten material. Thus, the heating element (not shown) may help maintain the molding material in an at least partially molten state within the system 100.

The dispenser 115 can be used to dispense a precise and/or predetermined quantity of molten material in the shape of droplets to form one or more energy directors 125 onto a composite substrate 130. A series of droplets of energy directors 125 can be formed at a desired volume flow rate and ejected onto the substrate 130. This substrate is preferably a composite substrate adapted to bond so as to form so as to form one or more energy directors 125 on the composite substrate 130.

The system 100 generates substantially fixed size drops that can be independently ejected from the nozzle 120 of the dispenser 115. Under controlled conditions, the system 100 can accurately and reliably reproduce dispense drop sizes in the range from 0.010 mm-10 mm drop diameter.

The system 100 has the ability to accurately dispense the molten material, such that each energy director 125 has a predetermined volume onto a pre-selected location of the composite substrate 130. In various embodiments, a method is provided for adjusting the geometry and size of the energy directors 125 by drop volume control. In some embodiments, the dispensed volumes can be measured optically, gravometrically or by using other means. Such measurement techniques and apparatus are well known, and hence will not be described in detail herein.

In some embodiments, the geometry and size of the energy directors can be determined by system parameters, such as the shape and size of the nozzle. In one embodiment, system 100 can incorporate a nozzle 120 that is readily removable and replaceable.

The dispense system 100 may be maneuvered in several ways to provide relative displacement between the system 100 and the composite substrate 130. In one embodiment, the composite substrate 130 may be positioned on a movable X, X-Y, or X-Y-Z stage (not shown). The movable stage can also be used in combination with one or more robot arms (not shown) to maneuver the dispenser to a desired location.

In various embodiments, an automated control system 900 may be used in conjunction with the single pass dispense system 100 to monitor and control the movable stage, the adjustable geometry of the energy director, and other associated components of the dispense system. The droplets can be emitted in accordance with the input signals from the controller representing the predetermined pattern. The controller can control the dispensing of each droplet to the specific location on the moving stage. The geometry of the energy directors 125 can be adjusted simply by changing the programmed volume flow rate of the molten material ejected onto the composite substrate 130.

During use of the single pass dispense system 100 operating with a single dispenser 115 having a single nozzle 120, individual droplets can be dispensed to form energy directors 125 at preprogrammed positions. This can be accomplished by synchronizing the dispensing of the droplet from the nozzle 120 with the movement of the X, X-Y or X-Y-Z stage. A volume of molten material is pushed down the nozzle 120 forming a droplet at the orifice. The droplet will have a geometry determined and controlled by a controller based on the specific application.

During operation, a single substrate can be placed on a translation stage. In one exemplary embodiment of the mode of operation, the dispenser 115 can remain fixed at a specific location while the stage moves to deposit a specified pattern or numbers of energy directors onto the composite substrate 130. A predetermined area which covers a substrate region can be pre-programmed such that the number of energy directors needed to achieve a desired concentration per unit area can be calculated. Based on the number of total energy directors needed, the array spacing and drops needed at a specific location can be calculated. These values are easily adjusted depending on the specific application parameters. Thus, the desired pattern can be deposited onto the composite substrate 130. In this mode, the stage can move continuously as single droplets of molten material is dispensed, depositing energy directors without stopping the translational stage.

Figure 1B:
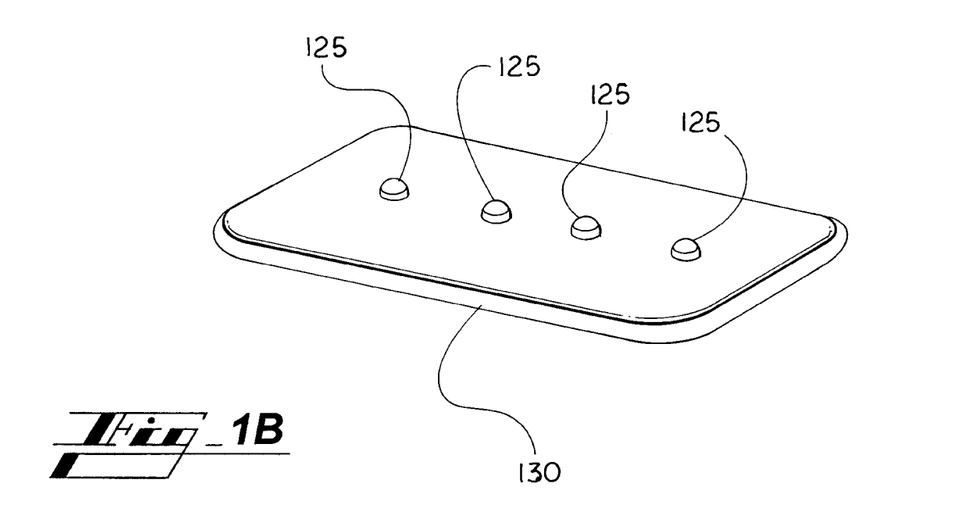
FIG. 1B illustrates the energy directors of FIG. 1A in a resolidified state after being deposited onto the composite substrate.

Once the molten material leaves the heated area, these resins solidify rapidly as energy directors 125. FIG. 1B illustrates the energy directors 125 in a resolidified state after being deposited onto the composite substrate 130 and allowed to resolidify. A solidifying process can be employed to cause the molten material to undergo a transition from the molten material state to a solid state. The solidifying process can include any temperature lowering environment or mechanism that lowers the temperature of the molten material to cause the molten material to solidify.

Features and components shown in other figures may be incorporated and used with those shown in FIGS. 1A and 1B, and components may be mixed and matched between any of the configurations shown.

Figure 2A:
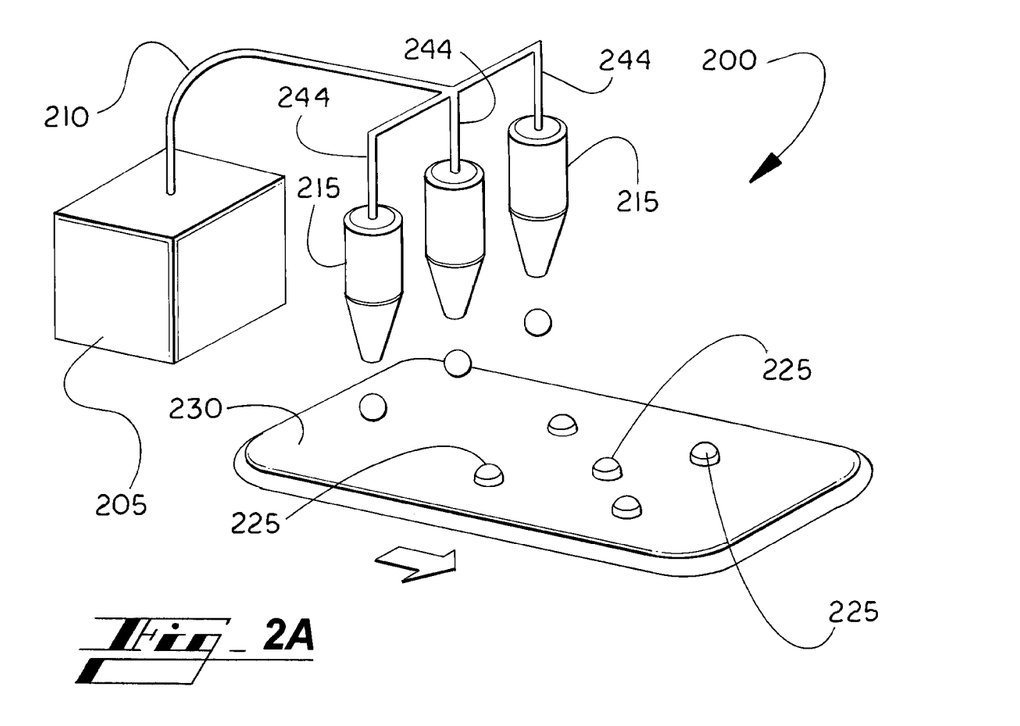
FIG. 2A illustrates the deposition of a plurality of energy directors onto a composite substrate in a single pass using multiple nozzles.

FIG. 2A illustrates the deposition of a plurality of energy directors onto a composite substrate in a single pass using multiple nozzles. In addition to using single nozzles described with regards to FIG. 1A, other possible arrangements include multiple nozzles 225, each one supplied from one or more reservoir 205 for the molten material to be dispensed. In some embodiments, the multiple nozzles 225 can include individual nozzles that can be operated simultaneously or independently. In other embodiments, the multiple nozzles 225 can include a multiple-nozzle device contained as a single unit.

Figure 2B:
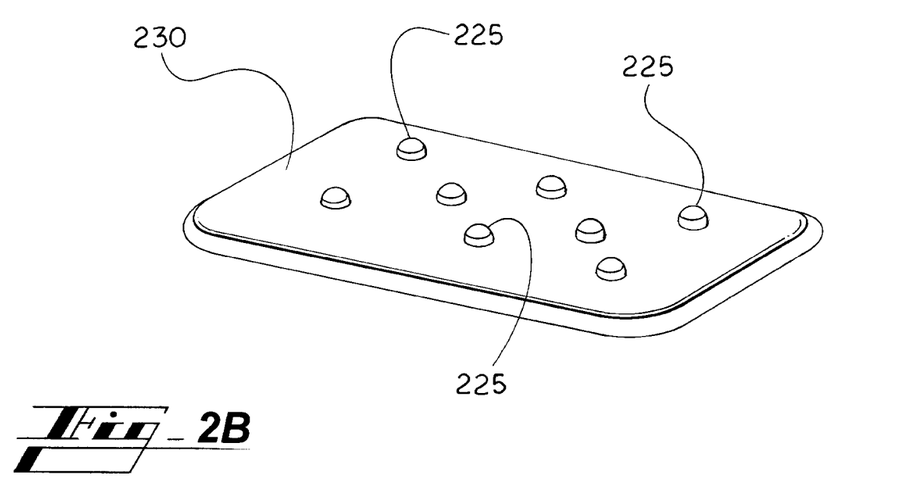
FIG. 2B illustrates the energy directors of FIG. 2A in a resolidified state after being deposited onto the composite substrate.

The embodiment shown in FIGS. 2A and 2B includes three dispensers 215 connected to a single reservoir 205 via conduit 210 that branches off into three respective conduits 244. It should be noted that the number of dispensers and reservoirs may be varied to meet design or application requirements. An array of nozzles 225 with separate reservoirs 205 can be used with each dispensing a separate molten material. In some embodiments, each of the reservoirs 205 may contain the same or a different type of molten material. Thus, each dispenser 215 can deposit a different molten material to form one or more energy directors 225 at different positions on the composite substrate 230.

FIG. 2B illustrates the energy directors of FIG. 2A in a resolidified state after being deposited onto the composite substrate.

Figure 3A:
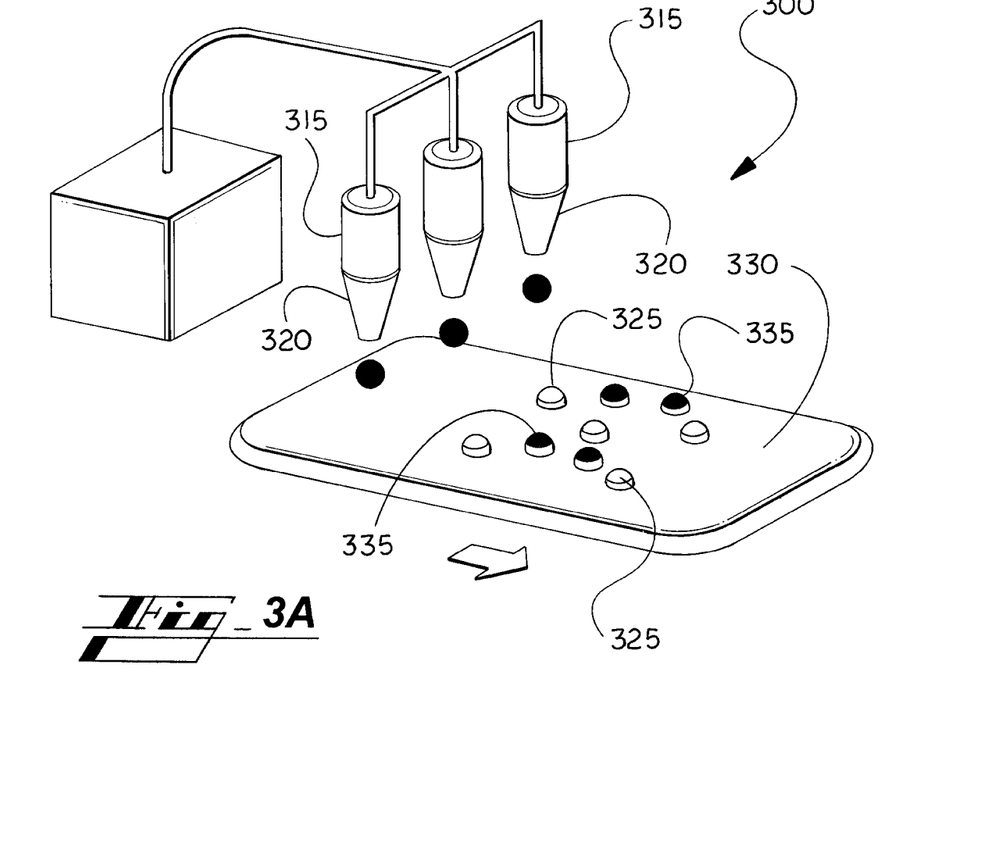
FIG. 3A illustrates the deposition of a plurality of energy directors onto a composite substrate in multiple passes using multiple nozzles.

FIG. 3A illustrates the deposition of a plurality of energy directors onto a composite substrate in multiple passes using multiple nozzles to selectively increase the drop density. Multiple droplets of molten material can be selectively dispensed repeatedly at specific locations during multiple passes such that the multiple droplets converge to increase the drop density. In this embodiment, a plurality of coatings may be applied. In some embodiments, each coat comprises a different molten material and, if required, each coat has a different thickness. Thus, at the time of dispensing, a single coating of the molten material may be applied, or a combination of coatings having the same or different molten materials, and having the same or different thicknesses.

FIG. 3A depicts how a drop-on-demand dispense system 300 can dispense molten material onto the composite substrate 330 utilizing a number of dispensers 315. The drop-on-demand system 300 enables the same or different molten material to be placed in very close proximity to one another to form energy directors 325. In one embodiment, the molten material may be adjacent to or overlap one another. Layered molten material 335 can be constructed where droplets of the same or different molten material are place on top of one another. For instance, layers of molten material can be dispensed in multiple passes of the dispensers 315 over the composite substrate 330, where a thin layer of molten material is dispensed during each pass.

Several approaches of dispensing the molten material can be employed by the dispense system 300. In one approach, as depicted in FIG. 3A, the composite substrate 330 may be moved past a stationary, array of dispensers 315. Another approach, however, involves maintaining the composite substrate 330 in a stationary position while the dispensers 315 are moved over the composite substrate 330 horizontally and/or vertically.

In various embodiments, the multiple pass dispense system 300 can be operated in series (sequential or individual activation), parallel (simultaneous activation) or a combination thereof. In series operation, fluid is dispensed from each of the dispenser nozzles 320 in succession at predetermined intervals. During series dispensing, the dispensers 315 may be operated sequentially at predetermined intervals or they may be operated substantially continuously, as dictated by the particular nature of the application.

In a parallel operating mode, it is also possible to arrange the multiple dispensers 315 in the form of a parallel dispenser on a common valve bank and to dispense in this manner different molten material simultaneously and independently from one another. When a large number of nozzles are used in parallel, this mode of operation allows the simultaneous dispensing of different materials delivered from multiple nozzles. This technique also provides good alignment capabilities and a precise control over the volume of deposited materials.

A number of nozzles 320 can be arranged in an array of columns and rows allowing for single or multiple passes to form a pattern. Each nozzle has the ability to turn material flow on or off thus allowing various configurations, such as droplets, dashes and/or lines to be formed on the composite substrate. In various embodiments, the droplets, dashes, lines and combination thereof can produce any desired pattern. After drying or partial drying, an additional layer of patterning can be repeated until the desired pattern is formed from a plurality of different layers.

Using the dispense system 300, one or more energy directors 325, 335 can be placed on the composite substrate 330 in complex patterns, due to the presence of multiple dispensers 315, due to each of their nozzles 320 being able to dispense small amounts of molten material, and due to different sets of the nozzles 320 being able to dispense different molten material. The dispense system 300 can control the volume of the molten material so that the dispensers 315 dispense the molten material onto the composite substrate 330 in the desired volumes. Different approaches can be utilized by the system 300 to verify the volumetric output of the molten material, for example, an optical approach, conductivity-based approach, and a gravimetric-based approach.

The control system 900 can be used to control the dispense system 300 to control at least the pattern of the energy directors 325, 335 on the composite substrate 330. The control system 900 may, for example, by specifying various dispensing parameters define which of the nozzles 320 of the dispensers 315 are to be used and in which order, define the pattern of the energy directors 325, 335 to be dispensed onto the composite substrate 330. Thus, the control system 900 can be used to define how the pattern is to be formed. The control system 900 can also define the volume ejected out of each nozzle 320 being used. In this manner, the control system 900 controls at least the formation of the energy directors 325, 335 dispensed on the composite substrate 330. The shape aspect of the energy directors 325, 335 can be controlled. The texture and/or thickness of the energy directors can be controlled, such as by controlling the number of layers of the molten material to be dispensed on the composite substrate.

Figure 3B:
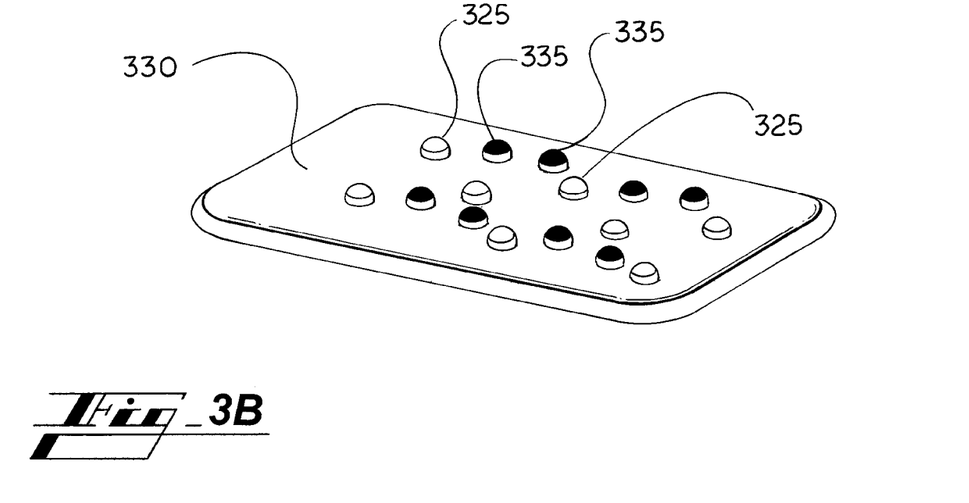
FIG. 3B illustrate the energy directors of FIG. 3A in a resolidified state after being deposited onto the composite substrate.

Solidifying of the molten material can occur when all the deposition is complete. FIG. 3B illustrates the energy directors of FIG. 3A in a resolidified state after being deposited onto the composite substrate.

Figure 4A:
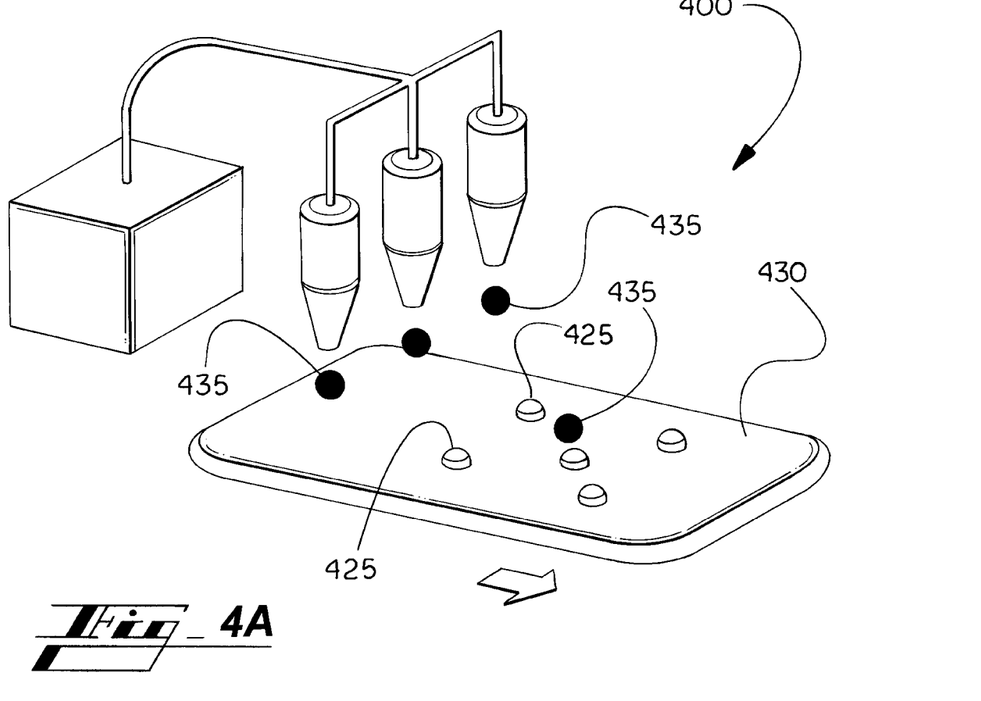
FIG. 4A illustrates the deposition of a plurality of energy directors onto a composite substrate in multiple passes using multiple nozzles where the drops are applied at select locations to increase selected drop sizes.
Figure 4B:
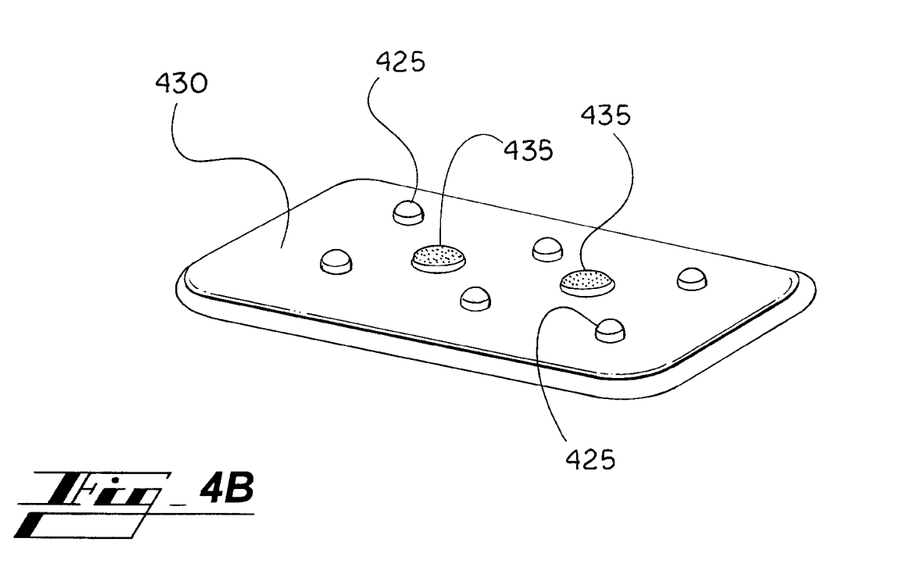
FIG. 4B illustrates the energy directors of FIG. 4A in a resolidified state after being deposited onto the composite substrate.

FIG. 4A illustrates the deposition of a plurality of energy directors onto a composite substrate in multiple passes using multiple nozzles where the drops are applied at select locations to increase selected drop sizes.

In FIG. 4A, the locations at which the molten material is placed on the composite substrate 430 can be precisely controlled. Additionally, the amount of the molten material that is placed on the substrate 430 can be precisely controlled. Furthermore, the formation of each energy director 425, including the thickness, shape and/or texture, of each energy director 425 can be precisely controlled. While six locations at which the energy directors 325 have been placed on the substrate 330 and three additional droplets being dispensed are depicted in FIG. 3A, there may be more or less of such locations in other embodiments.

The system, method and technique described with regards to FIG. 3A can be similarly employed in the drop-on-demand dispense system 400 to vary the drop size of the energy directors 425, 435. For example, one or more energy directors 435 can be formed larger than other energy directors 425 positioned on the same substrate 430.

Figure 5A:
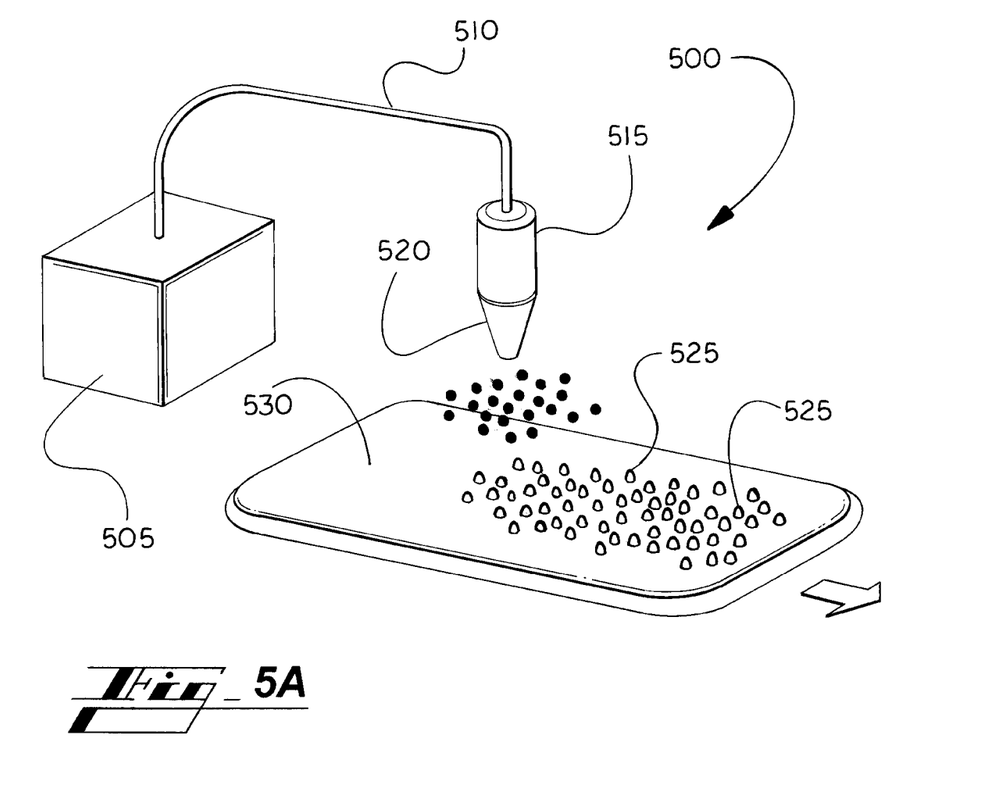
FIG. 5A illustrates the deposition of a plurality of energy directors onto a composite substrate by spraying using a single spray nozzle.

FIG. 5A illustrates the deposition of a plurality of energy directors onto a composite substrate by emitting atomized molten metal particles in the form of a spray using a single spray nozzle. The spray coating process involves the deposition of coatings from a spray of high velocity finely divided particles in a molten or semi-molten state impinging onto a composite substrate 530. The fluid molten material can be broken up into very fine particles emanating from the nozzle 520. The molten material is atomized and propelled to the composite substrate 530.

The spray dispense system 500 includes a reservoir 505 that accommodates the molten material. The reservoir 505 is constructed to supply a flow of the molten material to a dispenser 515 via conduit 510. The dispenser 500 can include a nozzle 520 constructed to direct the spray of molten material towards the composite substrate 530. The molten material is expelled out as a spray to deposit energy directors 525 in the form of multiple droplets on the composite substrate 530. The sprayed molten material cools while falling onto the composite substrate 530 to form solid energy directors 525.

Different spraying methods, such as flame spraying, thermal spray devices, high-velocity air-fuel spray devices, plasma spraying, and electric arc spraying can be used to coat the composite substrate 530.

Various coatings of the energy directors 525 can be achieved using different combinations. The system components, parameters, and the desired coating of energy directors and properties can be determined in order to select the type of material and equipment needed for the process. The process may be tailored for a particular application after establishing these parameters.

Control system 900 can control the temperature and velocity of the spray of molten material. In various embodiments, the composite substrate 530 towards which the spray is directed may be stationary, rotating, moving generally or moving in a linear manner. The controller 900 can be used to control a spray density or flow rate per unit area impinging on the composite substrate advancing at a constant speed. The accumulation of the deposition of the molten material on the composite substrate 530 can be controlled to adjust the thickness so as to produce a substantially uniform deposit across the flat composite substrate 530. In some embodiments, the temperature and velocity of the molten material can be adjusted so that upon hitting the composite substrate 530 the energy directors 525 cover a predetermined area.

Figure 5B:
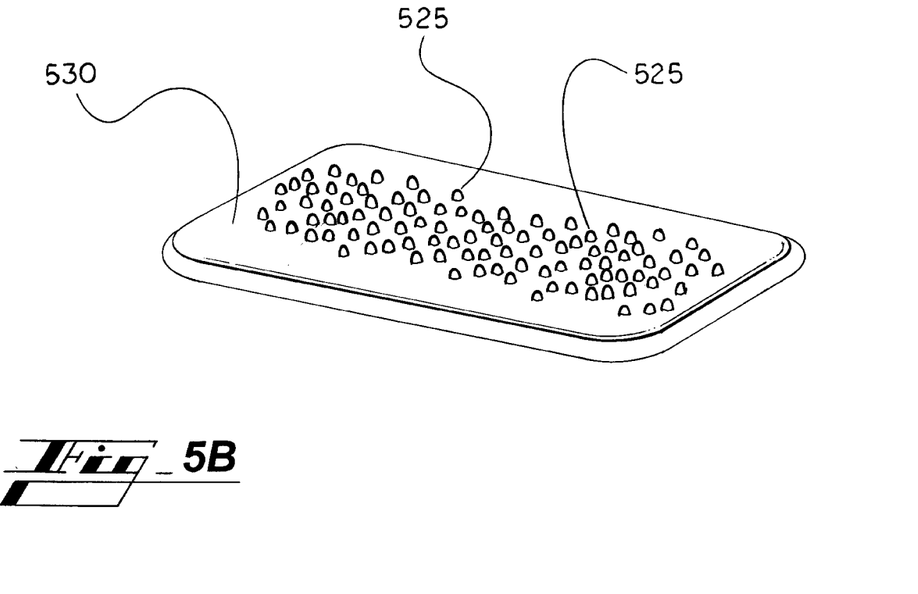
FIG. 5B illustrates the energy directors of FIG. 5A in a resolidified state after being deposited onto the composite substrate.

The spray deposited molten material subsequently solidifies onto the composite substrate 530. FIG. 5B illustrates the energy directors of FIG. 5A in a resolidified state after being deposited onto the composite substrate.

Figure 6A:
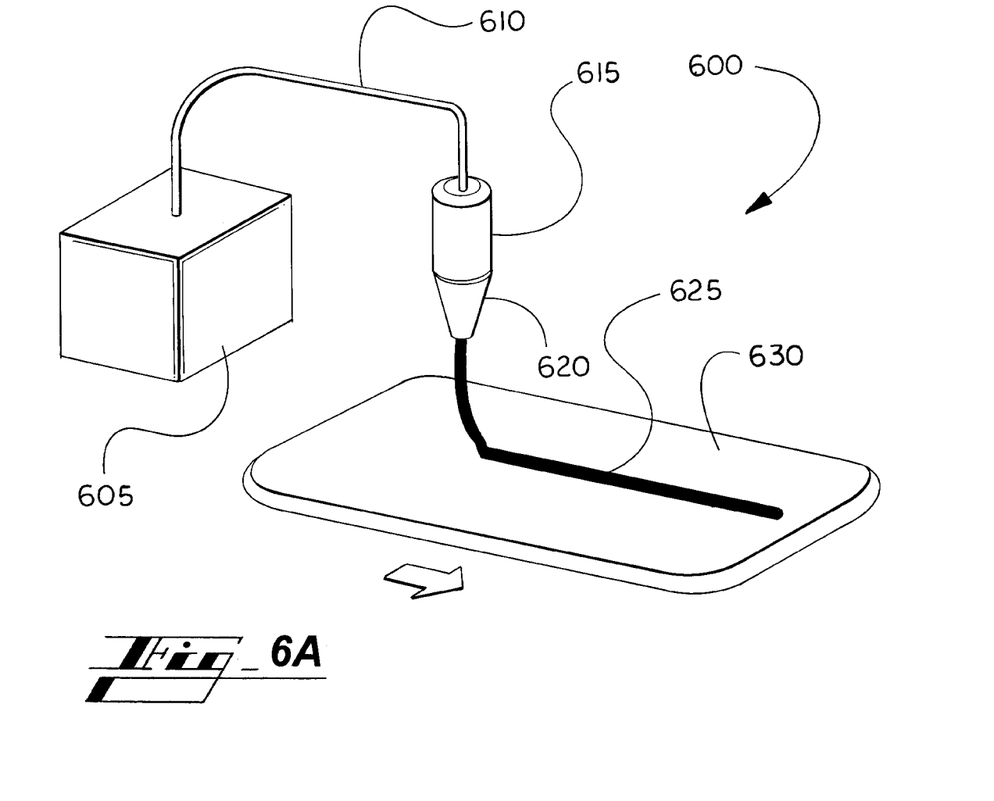
FIG. 6A illustrates the deposition of an energy director onto a composite substrate emitted in a continuous stream pattern using a single nozzle.

FIG. 6A illustrates a continuous stream dispense system 600 for the deposition of an energy director onto a composite substrate 630 emitted in a continuous stream pattern using a single nozzle 620.

In this example, the system 600 utilizes a dispenser 615 having a single nozzle 620 for dispensing a molten material onto the composite substrate 630. Under the direction of a controller 900 in response to data signals, the composite substrate 630 can be moved at a pre-determined velocity in a single-pass, straight-through path of travel. The dispenser 615 is the type having a continuous stream of droplets issued from the nozzle 620 to be accurately deposited in specific locations on the composite substrate 630.

In a continuous dispensing mode, the controller 900 is set to a prescribed flow rate to deliver a predetermined volume of the molten material. The dispenser 615 emits from the nozzle 620 the continuous stream 625 of energy directors to the composite substrate 630. The composite substrate 630 may be moved on a translation stage (not shown) at a constant velocity in a direction relative to the dispenser 615. In this mode, the stage can be moved continuously as a single continuous stream of molten material is dispensed.

Figure 6B:
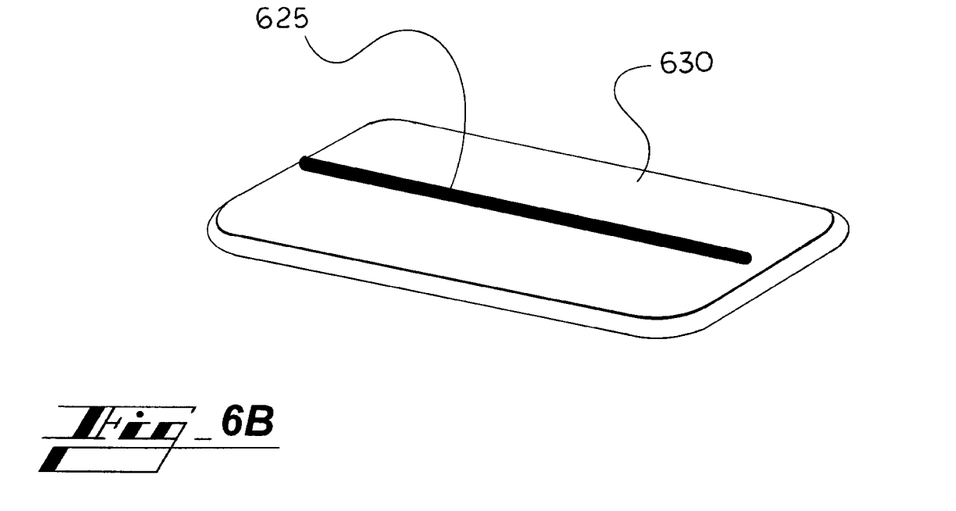
FIG. 6B illustrates the energy director of FIG. 6A in a resolidified state after being deposited onto the composite substrate.

Although the embodiment shown in FIGS. 6A and 6B includes a single dispenser 615 connected to a single reservoir 605 via conduit 610, it should be noted that the number of dispensers and reservoirs may be varied to meet design or application requirements. In some embodiments, multiple dispensers having multiple nozzles may be utilized to emit several continuous streams. In such embodiments, each of the continuous streams may consist of a different type of molten material. Thus, each dispenser can deposit a different stream of molten material onto the composite substrate.

FIG. 6B illustrates the energy director of FIG. 6A in a resolidified state after being deposited onto the composite substrate.

Figure 7A:
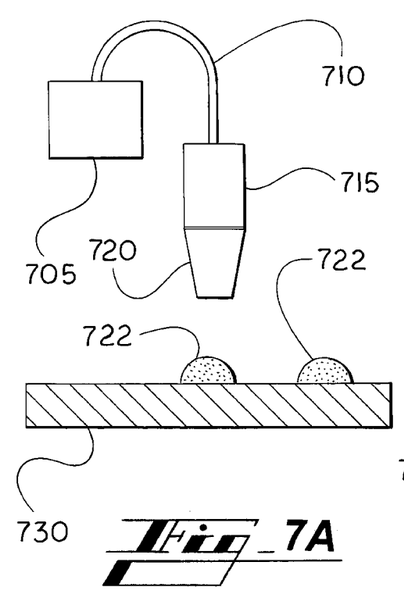
FIGS. 7A-7D illustrate an exemplary embodiment of the formation of energy directors onto a composite substrate using a three-dimensional (3D) template.
Figure 7B:
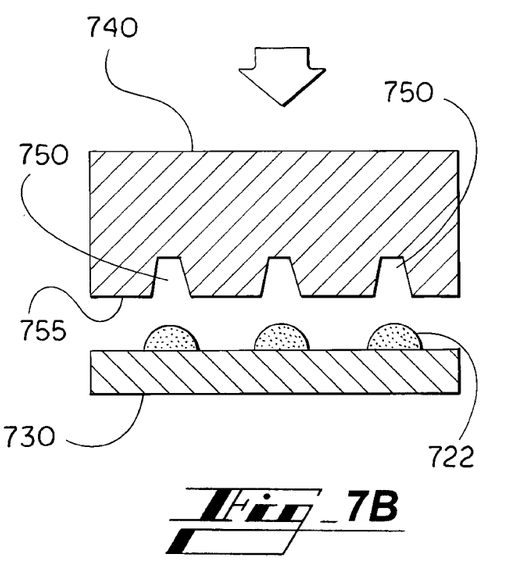

FIGS. 7A-7B is directed towards a system and method for the implementing a process for transferring a 3D pattern onto a composite substrate 730. FIGS. 7A-7D illustrate an exemplary embodiment of the formation of energy directors onto the composite substrate 730 using a 3D template 740.

In general, molten material is dispensed onto a composite substrate 730. A template 740 having a predefined topological pattern is brought into contact with the molten material by pressing together the template 740 and the composite substrate 730 under a certain pressure. The molten material solidifies to form the energy directors 725 onto the substrate 730. After the template 740 is separated from the composite substrate 730, the energy directors 725 are formed on the composite substrate 730 as solidified energy directors 725 having an imprint of any patterns formed in the template 740.

Specifically, in FIG. 7A, the dispense system 700 is configured to allow a precise volume control of the amount of molten material dispensed unto an underlying composite substrate 730. During use, the molten material is drawn from a reservoir 705 through a conduit 710. When the composite substrate 730 is properly positioned below, the molten material is dispensed through dispenser 715 from nozzle 720 onto a region of the composite substrate 730. In the illustrated embodiment, small droplets of molten material whose volume may be accurately specified are dispensed.

FIG. 7B depicts the 3D template 740 having a mold thereon. The mold includes a plurality of features defined by a plurality of spaced-apart recessions 750 and protrusions 755. The patterned template 740 is positioned in a spaced relationship to the portion of the substrate 730 upon which the droplets 722 of the molten material are disposed such that a gap is created between the template 740 and the substrate 730.

Figures 7C, 7D:
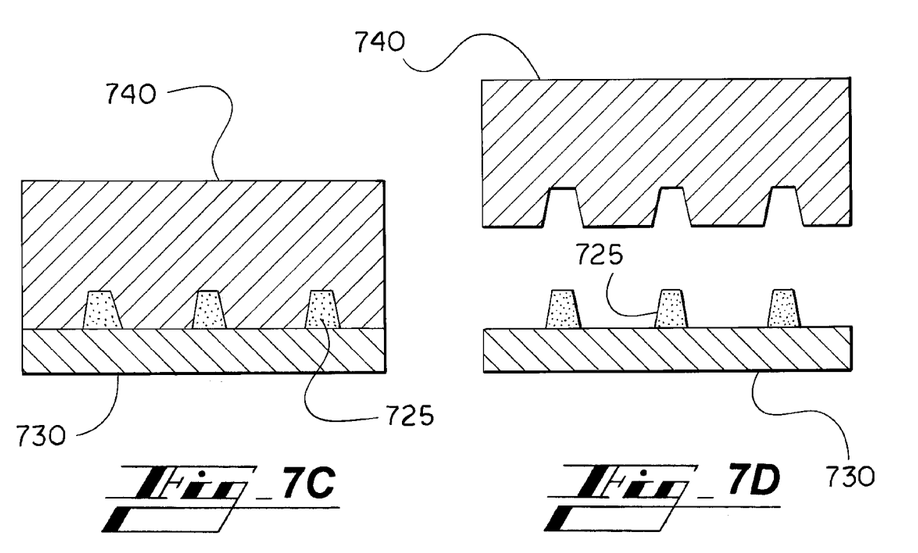

As shown in FIG. 7C, the plurality of features defines a pattern that is transferred onto the droplets 722 to form energy directors 725 the substrate 730 when the template 740 is brought into contact with the composite substrate 730. The pattern of the template is pressed into the droplets 722 causing the molten material to flow and fill up the empty areas of the recessions 750 of the mold due to the applied pressure. In various embodiments, the 3D template may be designed with a random pattern, a uniform pattern or a combination thereof.

As shown in FIG. 7D, after cooling down to solidify the molten material, template 740 and the composite substrate 730 are separated, leaving a 3D structure of energy directors 725 formed on the substrate 730 that is complementary to the pattern on the mold of the template 740. The 3D template 740 can be controlled by controller 900 to allow proper release from the composite substrate 730. Then, the 3D template 740 may be reused for multiple cycles.

FIGS. 8A-8D illustrate another exemplary embodiment of the formation of energy directors onto a composite substrate using a 3D template. FIGS. 8A-8D depict a technique for fabricating energy directors 825 in 3D by flowing molten material through a 3D template 840.

System 800 may include a 3D template 840 including a manifold 842, a contact surface 846 for contacting the surface of the composite substrate 830 and a pattern part comprising discharging orifices 850 which form a pattern of energy directors 825 after the molten material is filled therein and solidified.

The manifold 842 includes a network of channels 844 and one or more of the discharge orifices 850. The channels 844 terminate at corresponding ends in the template 840 in which are formed discharge orifices 850.

Figures 8A, 8B:
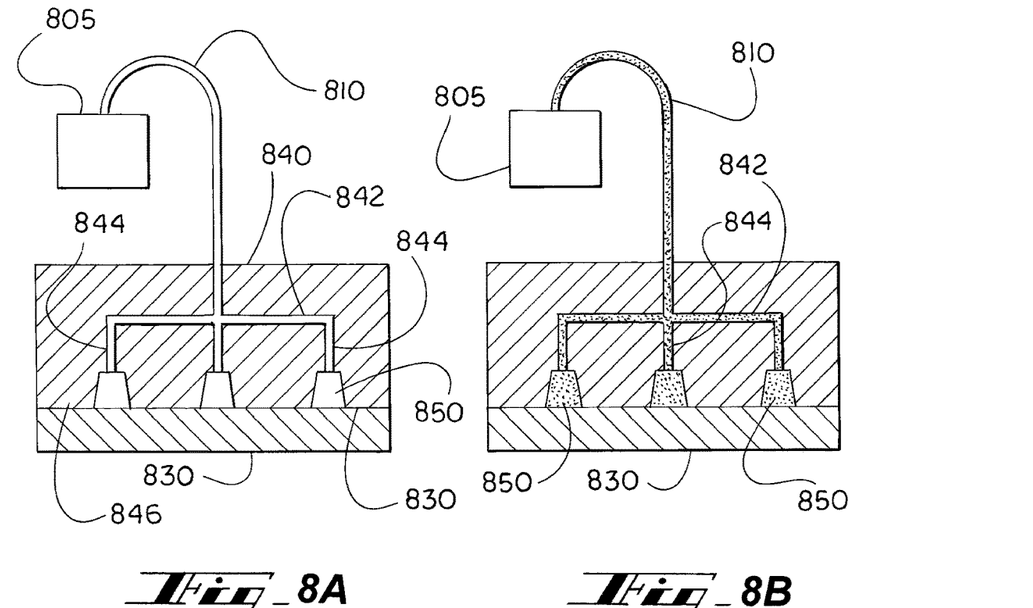
FIGS. 8A-8D illustrate another exemplary embodiment of the formation of energy directors onto a composite substrate using a 3D template.
Figure 9:
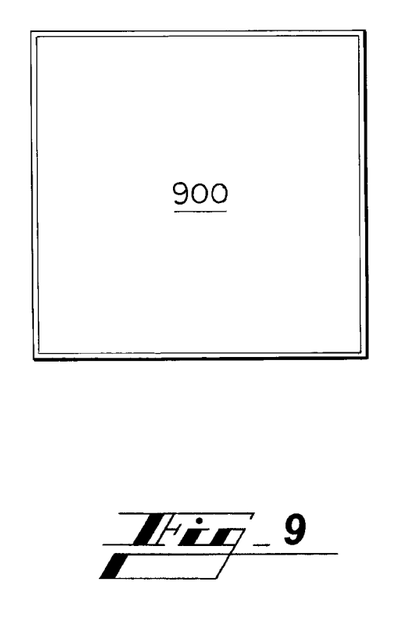
FIG. 9 illustrates a controller that may be utilized with one or more of the systems to provide open-loop or closed-loop feedback control.

In FIG. 8A, the template 840 is placed against the surface of the composite substrate 830 in order to seal the surface features of the template. An amount of pressure may be required to maintain the seal during the formation of the energy directors 825. In this technique, molten material is loaded into a reservoir 805 and delivered to the manifold 842 via conduit 810 that branches off into a multiplicity of parallel channels 844.

In FIG. 8B, during the filling process, the molten material may directly enter the manifold 842 through conduit 810 with each channel 844 being supplied with solidifiable molten material. The discharge orifices 850 may allow the molten material to flow into a defined volume to form the energy directors 825 onto the substrate 830.

In some embodiments, the system 800 may incorporate one or more heating elements (not shown) as a temperature-controlled means to ensure that the molten material remains in a flowable state while residing in the reservoir 805, conduit 810 or channel 844 prior to entering the orifice 850. Thus, the heating element (not shown) may help maintain the molding material in at least partially molten state within the system 800.

Figures 8C, 8D:
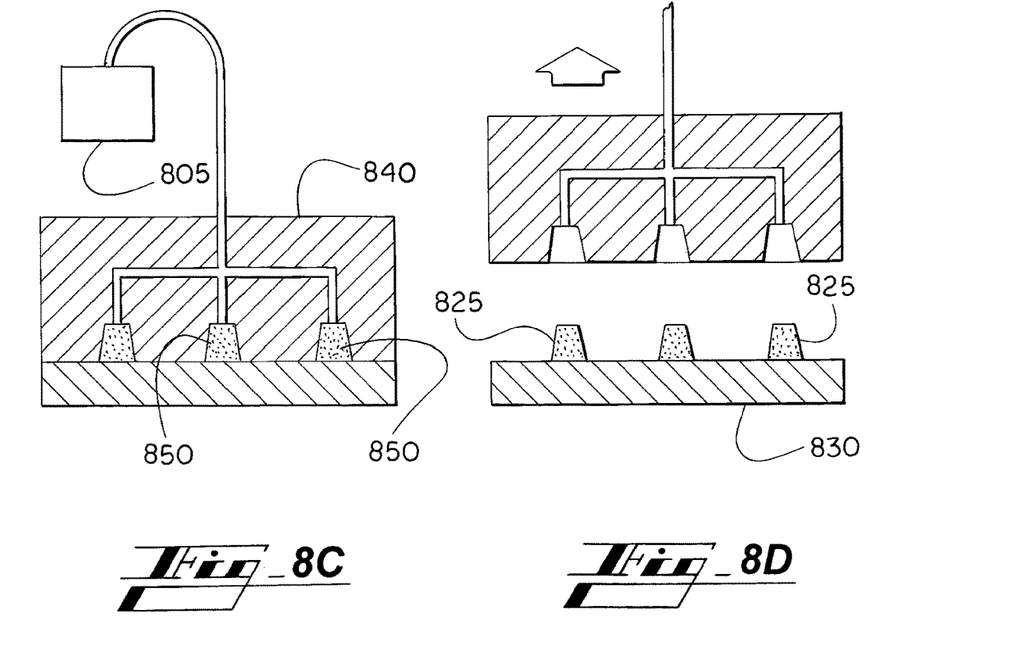

In FIG. 8C, the discharge orifices 850 are filled with the molten material. The pattern part is used as a mold for forming the energy directors 825 onto the composite substrate 830. The pattern part is formed of, for example, a plurality of discharge orifices 850 having a concave portion.

As shown in FIGS. 8A-8D, the discharge orifices 850 is configured so as to include a plurality of concave portions that are arranged at a pre-determined interval. In this example, each orifice 850 includes an upper part having a first width size and a lower part having a second width size larger than the first width size. The widths of the orifices 850 are larger than the width of the channels 844. The cross-section shape of the orifice is not limited to the exemplary embodiments depicted, but any shape can be used if it is capable of forming the energy directors 825 onto the substrate composite 830.

In FIG. 8C, as the molten material cools, the molten material solidifies as energy directors 825 preserving a pattern complementary to that of the template 840. In some embodiments, heating and cooling mechanism (e.g., heating elements and temperature controller; not shown) may be provided in a region surrounding the work surface to control the solidification behavior of the molten material on the composite substrate 830.

As shown in FIG. 8D, after solidification of the energy directors 825 onto the composite substrate 830, the template 840 is separated from the composite substrate 830 leaving behind the replicated structure on the substrate 830. The process can be readily controlled by tailoring properties, such as substrate topography, energy director shape, and surface interaction with the substrate.

In various embodiments, the controller 900 in FIG. 9 can operate any of the exemplary systems desired herein to selectively dispense the molten material to form at least one or more energy directors onto the composite substrate. Information, control signals, or image data signals can be applied to controller 900 as command signals to dispense the molten material. Image data signals representative of an image of the desired energy director pattern can be stored in designated memory locations in the controller 900.

The controller 900 can also include output ports that issue electrical control signals to various system components. Under the direction of the controller, the translation stage may be moved during the dispensing process at a constant velocity past one or more dispensers whereat droplets of molten material are directed at a specific location.

Sensors means (not shown) may be attached to various locations within the system to monitor the physical dimensions of the energy directors being deposited. The sensors can communicate with the controller 900. The sensors can be used to align the composite substrate relative to the dispenser. The controller can also promote the drop formation and adjust the volume of the molten material dispensed. The droplet velocities can also be controlled by the controller by increasing or decreasing the dispensing rate of the dispensers.

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A system, for forming additive energy directors, comprising:
    a substrate;
    a dispenser for dispensing a molten material onto the substrate at a predetermined location such that the molten material solidifies to form an additive energy director onto the substrate;
    a three-dimensional template positioned in a spaced relationship to the substrate, the three-dimensional template adapted to be moved into contact with the substrate after molten material has been dispensed onto the substrate to form a pattern of energy directors having a three-dimensional structure corresponding to the three-dimensional template; and
    a reservoir in fluid communication with the dispenser, the reservoir adapted to hold molten material for delivery to the dispenser, the reservoir being pressurized such that molten material held therein is delivered to the dispenser under pressure, wherein the molten material is forced through an orifice within a nozzle of the dispenser.

2. The system of claim 1, wherein the dispenser dispenses the molten material utilizing a drop-on-demand fluid drop emitting device.

3. The system of claim 1, wherein the dispenser dispenses the molten material utilizing a drop-on-demand fluid drop emitting device employing a single nozzle to dispense the molten material.

4. The system of claim 1, wherein the dispenser dispenses the molten material during multiple passes over the substrate utilizing a drop-on-demand fluid drop emitting device.

5. The system of claim 1, wherein the dispenser dispenses the molten material during multiple passes over the substrate utilizing a drop-on-demand fluid drop emitting device to selectively increase a drop density of the molten material dispensed onto the substrate.

6. The system of claim 1, wherein the dispenser dispenses the molten material during multiple passes over the substrate utilizing a drop-on-demand fluid drop emitting device to selectively increase a drop size of the molten material dispensed onto the substrate, wherein each of the multiple passes dispenses additional molten material and incrementally increases the drop size of the molten material dispensed onto the substrate.

7. The system of claim 1, wherein the reservoir is adapted to maintain a temperature of molten material held therein.

8. The system of claim 1, wherein the system is adapted to maintain a temperature of molten material within the reservoir, a conduit interconnecting the reservoir and the dispenser, the dispenser, and the nozzle.

9. The system of claim 1, further including an automated control system adapted to monitor and control movement of the dispenser, geometry and volume of additive energy directors formed onto the substrate by the dispenser, and to synchronize the dispensing of the molten material with the movement of the dispenser.

10. The system of claim 9, wherein the automated control system is further adapted to control a temperature and a velocity of the molten material being dispensed by the dispenser.

11. The system of claim 1, further including a plurality of dispensers, each one of the plurality of dispensers in fluid communication with the reservoir and adapted to dispense molten material simultaneously and independently.

12. The system of claim 1, further including a plurality of dispensers, and a plurality of reservoirs, wherein each one of the plurality of dispensers is in fluid communication with a one of the plurality of reservoirs and is adapted to dispense different molten materials independently.

* * * * *